(12) United States Patent
Kizaki et al.

(10) Patent No.: US 11,072,191 B2
(45) Date of Patent: Jul. 27, 2021

(54) IMAGE FORMING APPARATUS, CONVEYANCE CONTROL METHOD, AND RECORDING MEDIUM

(71) Applicants: Osamu Kizaki, Saitama (JP); Masayuki Fujii, Kanagawa (JP); Suguru Masunaga, Kanagawa (JP)

(72) Inventors: Osamu Kizaki, Saitama (JP); Masayuki Fujii, Kanagawa (JP); Suguru Masunaga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 21 days.

(21) Appl. No.: 16/526,209

(22) Filed: Jul. 30, 2019

(65) Prior Publication Data
US 2020/0039250 A1 Feb. 6, 2020

(30) Foreign Application Priority Data

Jul. 31, 2018 (JP) .............................. JP2018-144605
Jul. 22, 2019 (JP) .............................. JP2019-134898

(51) Int. Cl.
*B41J 2/435* (2006.01)
*B41J 11/00* (2006.01)
(Continued)

(52) U.S. Cl.
CPC ......... *B41J 11/0095* (2013.01); *B41J 2/2103* (2013.01); *B41J 13/0009* (2013.01)

(58) Field of Classification Search
CPC ........................... B41J 2/2103; B41J 13/0009
See application file for complete search history.

(56) References Cited

U.S. PATENT DOCUMENTS 6,287,027 B1 * 9/2001 Komiya ................. B41J 2/2103
 400/74
6,300,968 B1 * 10/2001 Kerxhalli ........... G03G 15/0152
 347/116

(Continued)

FOREIGN PATENT DOCUMENTS

JP 2008-254221 10/2008

OTHER PUBLICATIONS

U.S. Appl. No. 16/294,613, filed Mar. 6, 2019, Masayuki Fujii, et al.

*Primary Examiner* — Lam S Nguyen
(74) *Attorney, Agent, or Firm* — Harness, Dickey & Pierce, P.L.C.

(57) ABSTRACT

An image forming apparatus includes a printing device to print, on a recording medium, a colorimetric pattern including a plurality of colorimetric patches; an imaging device; a conveyor to convey the recording medium in a conveyance direction; and circuitry. The circuitry causes the printing device to form a plurality of marker patterns on a side of the colorimetric pattern and at predetermined intervals in the conveyance direction so that one of the marker patterns is downstream from a first row of the colorimetric patches in the conveyance direction; causes the conveyor to convey the recording medium to position the colorimetric pattern at a reading position by the imaging device based on a distance between the plurality of marker patterns and the colorimetric pattern in the conveyance direction; and causes the imaging device to read the colorimetric pattern on the recording medium.

8 Claims, 13 Drawing Sheets

(51) Int. Cl.
  *B41J 13/00* (2006.01)
  *B41J 2/21* (2006.01)

(56) References Cited

U.S. PATENT DOCUMENTS

| | | | | |
|---|---|---|---|---|
| 6,538,770 B1 * | 3/2003 | Mestha | .............. | H04N 1/00002 |
| | | | | 358/1.9 |
| 6,903,758 B1 * | 6/2005 | Kerxhalli | ........... | G03G 15/0152 |
| | | | | 347/116 |
| 7,583,282 B2 * | 9/2009 | Yamauchi | .......... | G03G 15/5062 |
| | | | | 347/229 |
| 2016/0156810 A1 * | 6/2016 | Nakamura | ......... | H04N 1/00023 |
| | | | | 358/1.9 |

* cited by examiner

MARKER PATTERN PRINT SIZE: a (mm)
PIXEL NUMBER OF MARKER PATTERN: Z PIXELS

MARKER PATTERN PRINT SIZE: a (mm)
PIXEL NUMBER OF MARKER PATTERN: Z PIXELS

IMAGE FORMING APPARATUS, CONVEYANCE CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-144605, filed on Jul. 31, 2018, and 2019-134898, filed on Jul. 22, 2019, in the Japan Patent Office, the entire disclosure of each of which is hereby incorporated by reference herein.

BACKGROUND

Technical Field

The present disclosure relates to an image forming apparatuses, a conveyance control method, and a recording medium storing a program for causing a computer to execute the method.

Description of the Related Art

There are printers provided with a colorimetric device that conveys a recording medium (or a print medium), such as paper and various media such as polyvinyl chloride (PVC), both downstream in a conveyance direction of the recording medium and upstream in the conveyance direction (return direction), prints a colorimetric pattern, and performs colorimetry of the colorimetric pattern. When performing colorimetry, such a printer prints a colorimetric pattern on the recording medium and then conveys the recording medium downstream to a dryer section to perform heating, blowing, etc. Then, after drying, the colorimetric device rewinds the recording medium upstream to the head position of the colorimetric pattern and sequentially performs colorimetry.

SUMMARY

An embodiment of this disclosure provides an image forming apparatus that includes a printing device configured to print, on a recording medium, a colorimetric pattern including a plurality of colorimetric patches; an imaging device configured to capture and read an image on the recording medium; and a conveyor configured to convey the recording medium in a conveyance direction. The image forming apparatus further includes circuitry configured to: cause the printing device to form a plurality of marker patterns on a side of the colorimetric pattern and at predetermined intervals in the conveyance direction, the plurality of marker patterns including a downstream marker pattern positioned downstream from a first row of the plurality of colorimetric patches in the conveyance direction; cause the conveyor to convey the recording medium to position the colorimetric pattern on the recording medium at a reading position by the imaging device based on a distance between the plurality of marker patterns and the colorimetric pattern in the conveyance direction; and cause the imaging device to read the colorimetric pattern on the recording medium.

Another embodiment provides a method for conveying a recording medium by an image forming apparatus configured to perform colorimetry. The method includes conveying the recording medium in a conveyance direction; printing, on the recording medium, a colorimetric pattern including a plurality of colorimetric patches; printing a plurality of marker patterns on a side of the colorimetric pattern and at predetermined intervals in the conveyance direction, the plurality of marker patterns including a downstream marker pattern positioned downstream from a first row of the plurality of colorimetric patches in the conveyance direction; conveying the recording medium to position the colorimetric pattern on the recording medium at a reading position by an imaging device based on a distance between the plurality of marker patterns and the colorimetric pattern in the conveyance direction; and reading the colorimetric pattern on the recording medium.

Another embodiment provides a non-transitory recording medium storing a plurality of program codes which, when executed by one or more processors, causes the processors to perform the method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
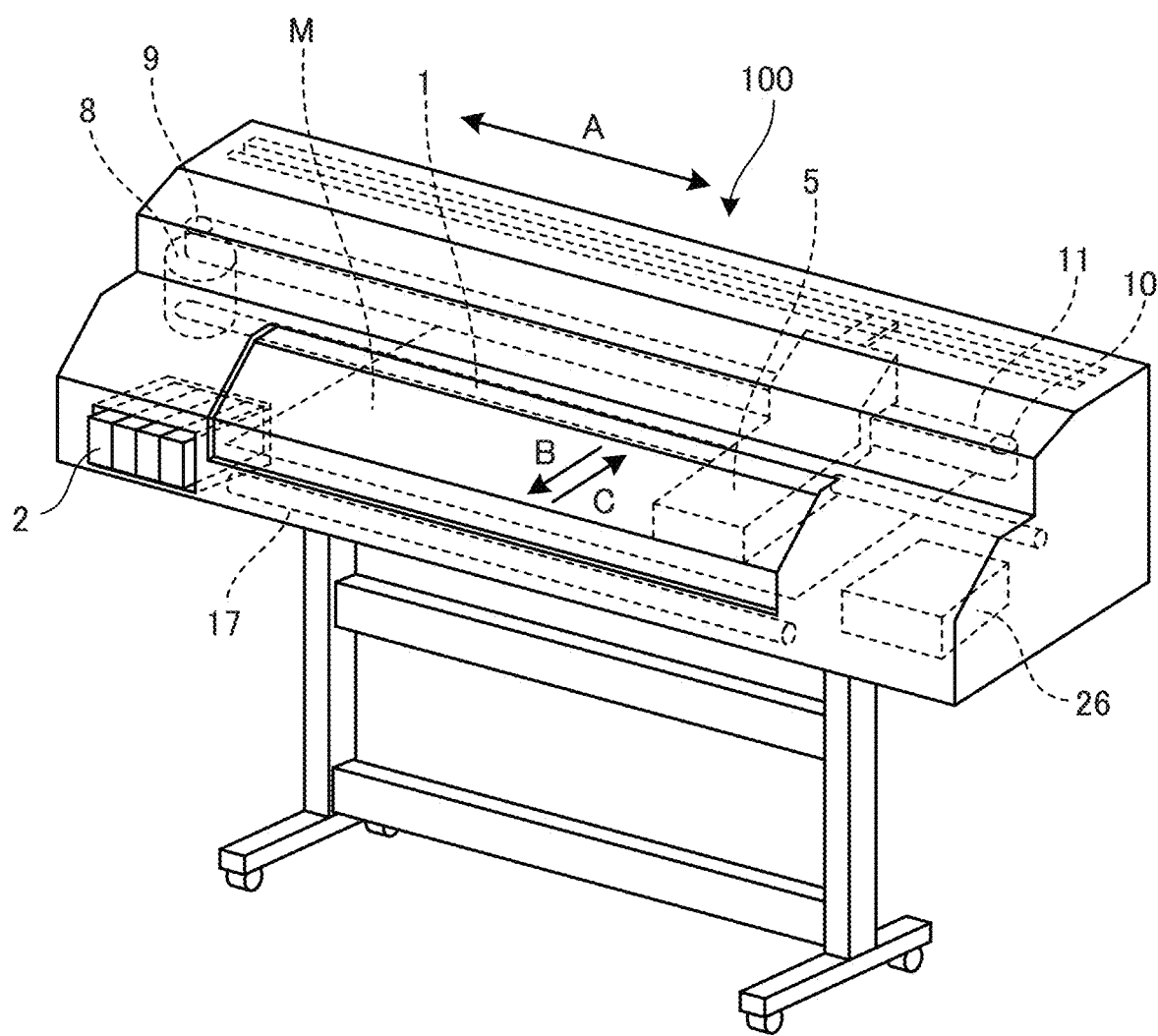
FIG. 1 is a perspective view illustrating an exterior of an inkjet recording apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an inkjet recording apparatus, as an example of an image forming apparatus according to an embodiment of the present disclosure, and a conveyance control method applied thereto are described. As used herein, the singular forms "a", "an", and "the" are intended to include the plural forms as well, unless the context clearly indicates otherwise.

The suffixes y, m, c, and k attached to reference numerals indicate only that components indicated thereby are used for forming yellow, magenta, cyan, and black images, respectively, and hereinafter may be omitted when color discrimination is not necessary.

Inkjet Recording Apparatus

Figure 2:
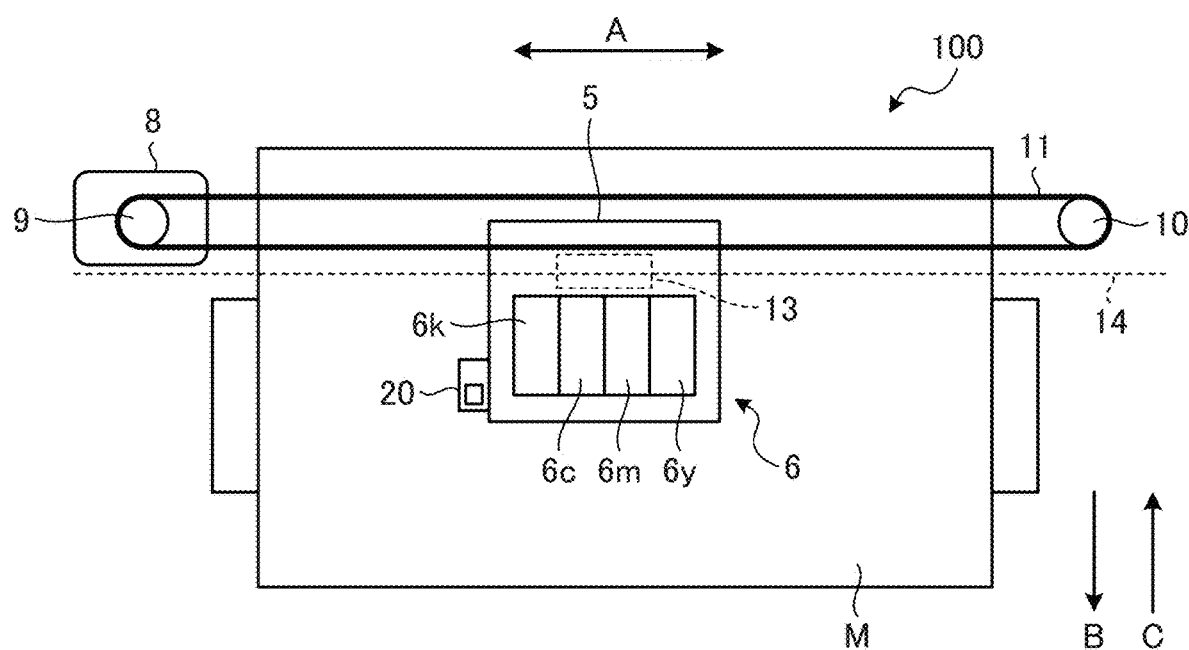
FIG. 2 is a plan view illustrating a scanning assembly of a carriage provided in the inkjet recording apparatus.

FIG. 1 is a perspective view illustrating an exterior of an inkjet recording apparatus 100 according to an embodiment. FIG. 2 is a plan view illustrating a scanning assembly of a carriage 5 provided in the inkjet recording apparatus 100. As can be seen from FIGS. 1 and 2, the inkjet recording apparatus 100 includes a guide rod 1 bridged between inner side plates inside the inkjet recording apparatus 100, the guide rod supports the carriage 5 movably in the direction indicated by arrow A (hereinafter also "main scanning direction A").

To the carriage 5, a timing belt 11, which is stretched around a drive pulley 9 and a pressure pulley 10, is coupled. As the timing belt 11 is driven by a main scanning motor 8 through the drive pulley 9, the carriage 5 reciprocates in the main scanning direction A. The timing belt 11 is tensioned by the pressure pulley 10, so that the carriage 5 can be driven without slack.

A recording medium M (such as a paper sheet) is intermittently conveyed along the direction indicated by arrow B (hereinafter also "sub-scanning direction B") below an area where the carriage 5 reciprocates. The sub-scanning direction B is a print direction. On the carriage 5, a recording head 6 including recording heads 6k, 6c, 6m, and 6y is mounted. Nozzles of the recording head 6 discharge ink (droplets) to the recording medium M on the platen 16, thereby forming a predetermined image. Note that the subscripts "k" represents a key plate (may be black), "c" represents cyan, "m" represents magenta, and "y" represents yellow. The recording medium M on which the image is formed is dried by a drying heater 17.

The inkjet recording apparatus 100 further includes a cartridge 2 to supply ink to the recording head 6 and a maintenance mechanism 26 to perform maintenance of the recording head 6 disposed on the carriage 5. An encoder sensor 13 is disposed in the carriage 5. While the encoder sensor 13 continuously reads an encoder sheet 14 stretched between the side plates, thereby detecting the position in the main scanning direction, the carriage 5 is driven.

A two-dimensional image sensor (hereinafter "two-dimensional sensor 20") serving as an imaging control unit is disposed on the carriage 5 and includes an imaging processing device capable of capturing print data on a recording medium. Thus, the two-dimensional sensor 20 can perform position detection and colorimetry processing of an image based on the captured image data.

(Configuration of Drive Control Mechanism)

Figure 3:
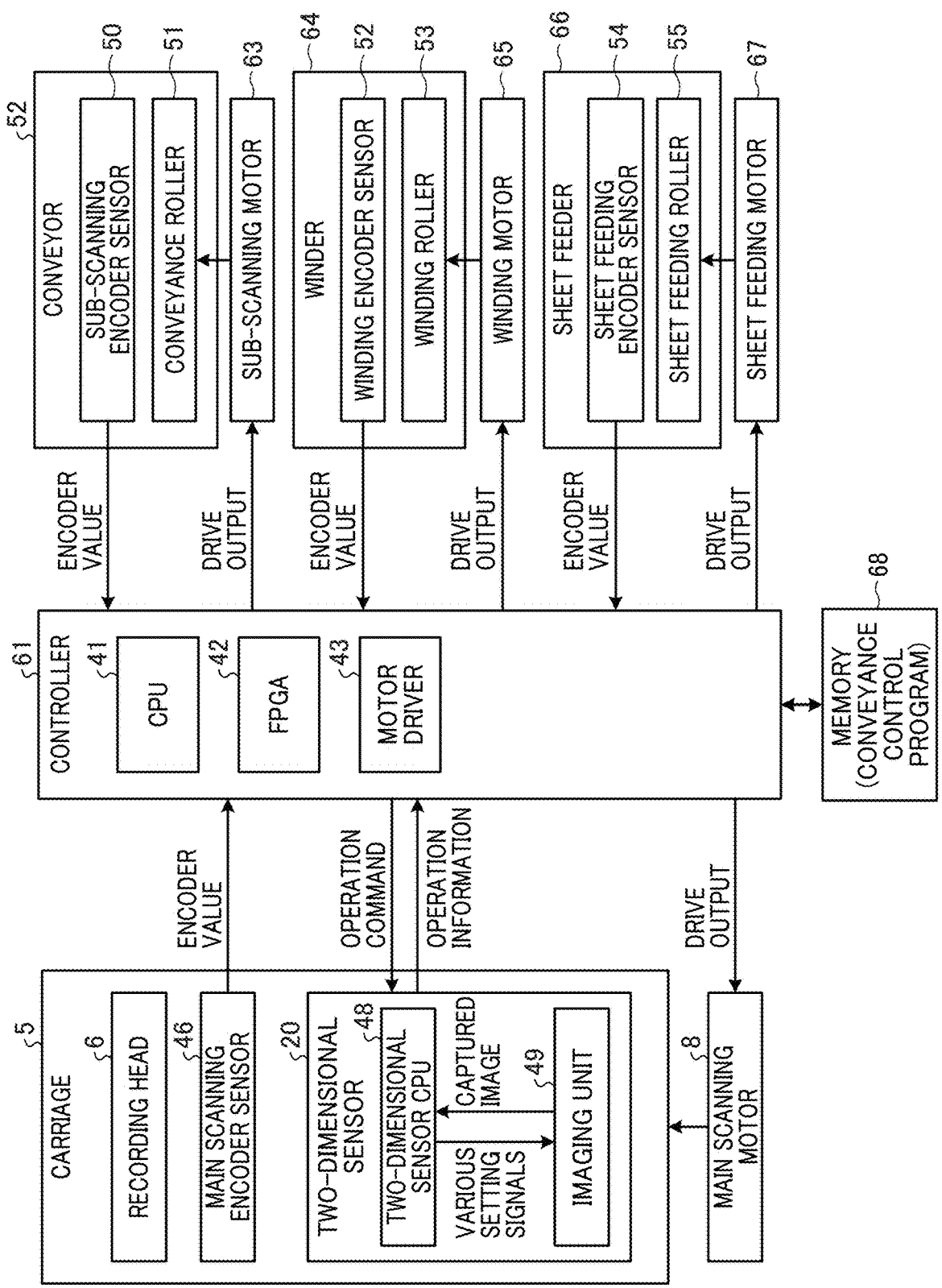
FIG. 3 is a block diagram illustrating a configuration of a drive control system of the inkjet recording apparatus, according to an embodiment.

FIG. 3 is a block diagram illustrating the configuration of a drive control system of the inkjet recording apparatus 100. As illustrated in FIG. 3, the drive control system of the inkjet recording apparatus 100 includes, in addition to the carriage 5 and the main scanning motor 8 described above, a controller 61, a conveyor 62, a sub-scanning motor 63, a winder 64, a winding motor 65, a sheet feeder 66, and a sheet feeding motor 67.

The controller 61 includes a central processing unit (CPU) 41, a field-programmable gate array (FPGA) 42, and a motor driver 43. The controller 61 performs CPU control, memory control, ink discharge control, sensor control, motor control, and the like.

The carriage 5 driven by the main scanning motor 8 includes a recording head 6, a main scanning encoder sensor 46, and a two-dimensional sensor 20 (two-dimensional image sensor, an example of an imaging device). The two-dimensional sensor 20 includes a CPU for the two-dimensional sensor 20 (i.e., a two-dimensional sensor CPU 48) and an imaging unit 49.

The conveyor 62 driven by the sub-scanning motor 63 includes a sub-scanning encoder sensor 50 and a conveyance roller 51. The winder 64 driven by the winding motor 65 includes a winding encoder sensor 52 and a winding roller 53. The sheet feeder 66 driven by the sheet feeding motor 67 includes a sheet feeding encoder sensor 54 and a sheet feeding roller 55. The recording head 6, the controller 61, the conveyor 62, and the winder 64 together construct an example of a printing device.

(Conveyance of Recording Medium in Printing)

Figure 4:
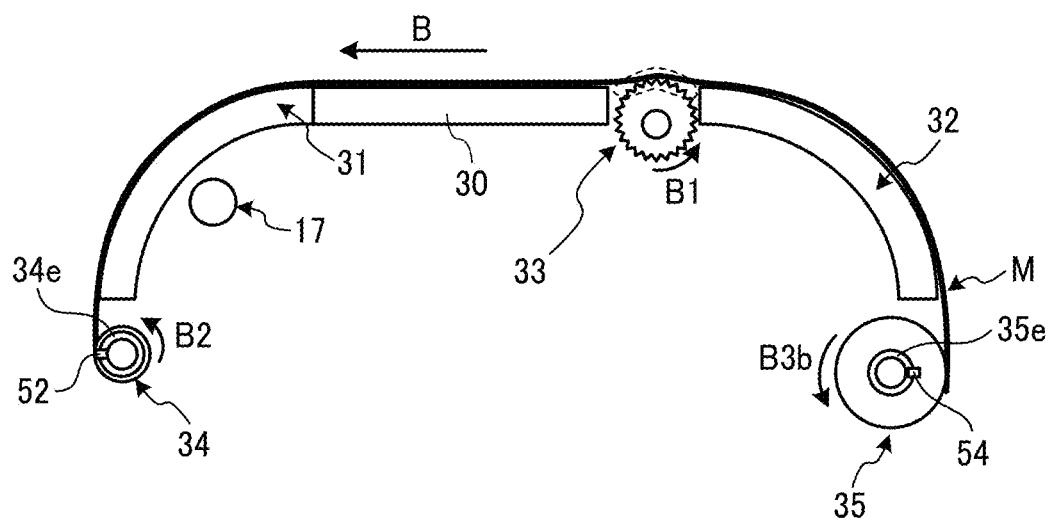
FIG. 4 is a cross-sectional view of a conveyance passage at the time of printing, according to an embodiment.

FIG. 4 is a cross-sectional view of a conveyance passage of the recording medium M at the time of printing. In FIG. 4, the recording medium M is set on a sheet feeding roller 35. Further, the recording medium M is guided by a sheet feeding guide 32, a conveyance roller 33, a platen 30, and a sheet ejection guide 31 in this order and secure to a winding roller 34. The winding roller 34, the conveyance roller 33, and the sheet feeding roller 35 are rotated by the winding motor 65, the sub-scanning motor 63 (a conveyance motor), and the sheet feeding motor 67, respectively, and together convey the recording medium M in the sub-scanning direction B. At this time, regarding the sheet feeding roller 35, the speed of the sheet feeding motor 67 is controlled so that the direction of the torque is opposite to the conveyance direction, to prevent deflection on the recording medium M on the conveyance passage. Generally, in conveyance of a recording medium, the conveyance performance fluctuates depending on the winding state of the sheet feeding roller and the winding roller, so it is necessary to adjust the conveyance accuracy. Adjustment of the conveyance accuracy differs depending on the conveyance direction and the type of recording medium.

After the printing process is performed on the platen, the drying heater 17 of the sheet ejection guide 31 dries the ink. Note that the drying process by the drying heater 17 is not necessarily required. Alternatively, after a colorimetric pattern is recorded thereon, the recording medium M can be left for a predetermined time until the ink dries.

Here, on the winding roller 34 and the sheet feeding roller 35, the diameter of the roll fluctuates depending on the winding amount of the recording medium M. In the example illustrated in FIG. 4, the diameter of the winding roll is small, and the diameter of the sheet feeding roll is large.

Since the roller surface has a certain degree of elasticity, the recording medium M bites into the roller surface, though the degree may be small.

In conveyance in the sub-scanning direction at the time of printing, as the diameter of the winding roll decreases, the amount of biting of the recording medium M into the conveyance roller 33 decreases. Further, as the diameter of the sheet feeding roll increases, the amount of biting of the recording medium M into the conveyance roller 33 decreases. On the conveyance roller 33, as the amount of biting of the recording medium M into the conveyance roller 33 increases, an apparent diameter of the conveyance roller 33 decreases. Accordingly, the conveyance amount decreases. By contrast, as the amount of biting decreases, the diameter of the conveyance roller increases, and the conveyance amount increases. At the time of printing, in order to keep the fluctuation of the conveyance amount constant, the rotation amount of the conveyance roller 33 is adjusted in accordance with the diameters of the winding and feeding rolls, thereby keeping the conveyance amount constant.

Note that the feeding roll diameter can be calculated from the rotational speed of a sheet feeding encoder sheet 35e and the sheet feeding encoder sensor 54. The winding roll diameter can be calculated from the rotational speeds of an encoder sheet 34e and the winding encoder sensor 52.

In addition to such roll diameter conditions, the biting into the recording medium M of the conveyance roller 33 differs depending on the type of recording medium M, and it is necessary to perform correction for each recording medium M. Such correction may be complicated.

In addition, in the case where the conveyance roller 33 is a metal roller, a grip force at the time of conveyance can be obtained by causing the recording medium M to bite into a mountain of the roller. However, there is an inconvenience that the difference in the biting amount results in errors in conveyance amount. On the other hand, when a ceramic roller or a rubber roller is used as the conveyance roller 33, conveyance amount errors are not caused by the difference in the degree of biting of the recording medium M into the conveyance roller 33. However, there may be a case where the recording medium M slips on the conveyance roller 33, resulting in a similar conveyance amount error (Conveyance of Recording Medium in Winding)

Figure 5:
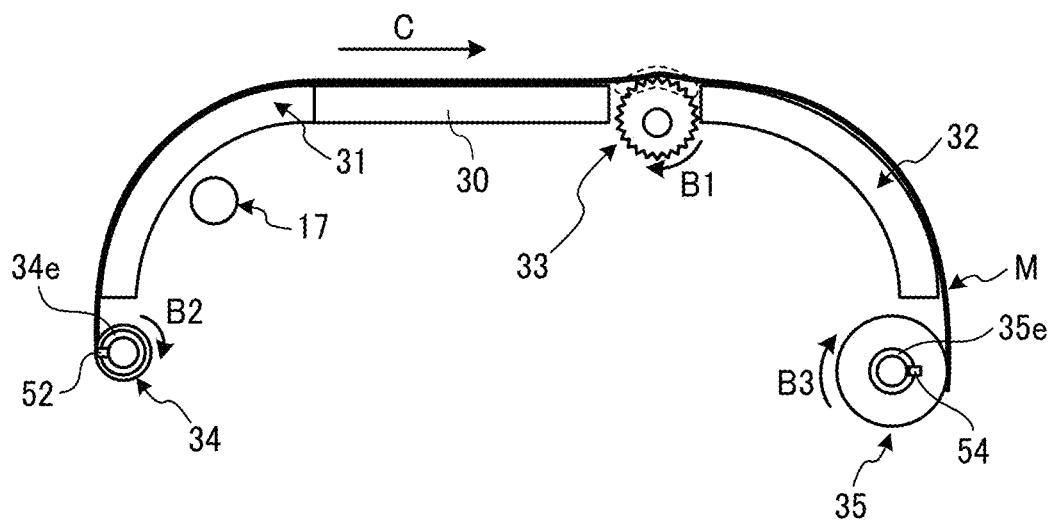
FIG. 5 is a cross-sectional view of the conveyance passage at the time of winding.

FIG. 5 is a cross-sectional view of the conveyance passage at the time of winding. At the time of winding, the rotation direction of the conveyance roller 33 is opposite to that at the time of printing. Although the rotational directions of the sheet feeding roller and the winding roller do not change, the rotational speed is adjusted, thereby conveying the recording medium M upstream in the sub-scanning direction as indicated by arrow C (hereinafter "sub-scanning reverse direction C" or "rewinding direction"). In the example illustrated in FIG. 5, the diameter of the winding roll is small, and the diameter of the feeding roll is large.

In the conveyance in the winding direction, as the diameter of the winding roll decreases, the biting of the recording medium M to the conveyance roller 33 increases, and the conveyance amount fluctuates in the direction of decreasing. Further, as the feeding roll diameter increases, the biting of the recording medium M to the conveyance roller 33 increases, so the conveyance amount fluctuates in the direction of decreasing (characteristic opposite to that in the print direction).

Similar to the time of printing, in order to keep the conveyance speed constant, the amount of rotation of the conveyance roller 33 is adjusted according to the type of the recording medium M, the winding roller diameter, and the sheet feeding roller diameter. However, there are many conditions for such adjustment, and the adjustment is complicated. Further, although a high conveyance accuracy is required at the time of printing, such a high conveyance accuracy is not required at the time of reverse conveyance (rewinding).

(Example Image Printed on Recording Medium for Colorimetry)

Figure 6:
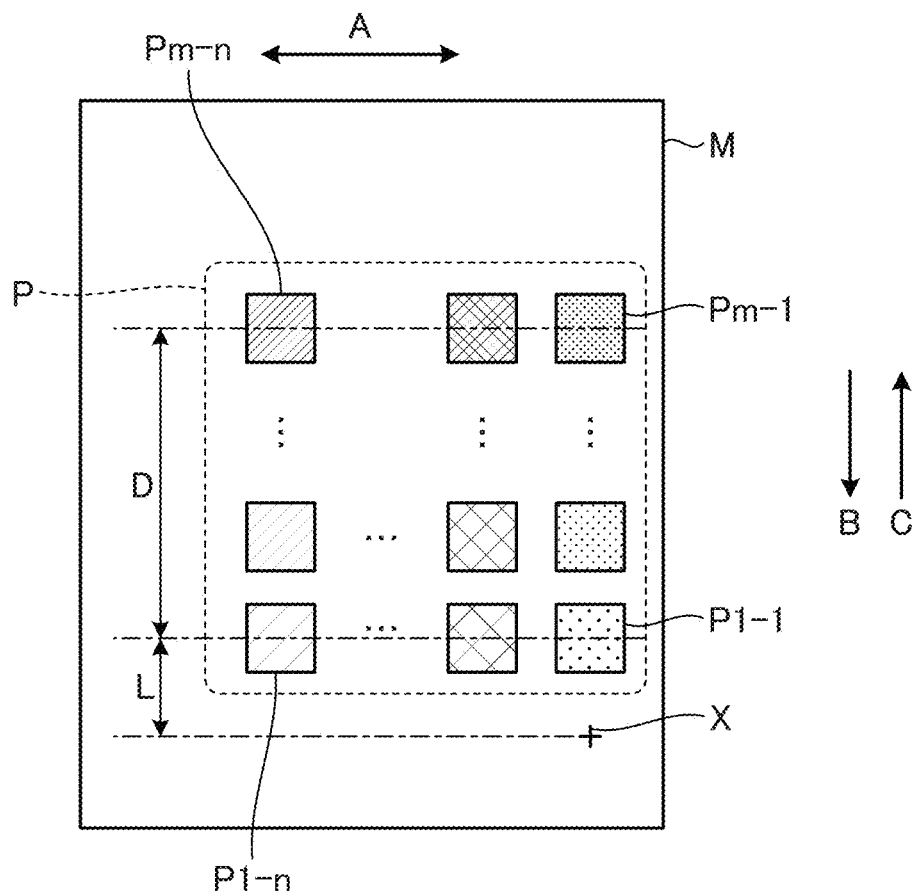
FIG. 6 is plan view illustrating an example of an image printed on a recording medium at the time of colorimetry.

FIG. 6 is plan view illustrating an example of an image printed on a recording medium at the time of colorimetry. As illustrated in FIG. 6, a colorimetric pattern P includes a group of patches P1-1 to Pm-n arranged in m rows multiplied by n columns (m×n). That is, a first row includes patches P1-1 to P1-$n$, and a first column includes patches P1-1 to Pm-1. A patch center of the m-th row is at a distance D from a patch center of the first row. Further, a marker pattern X for position adjustment is formed on the recording medium M. The marker pattern X is printed on the downstream side of the patch group and at a unique distance L from the colorimetric patch on the first row in the sub-scanning direction B.

(Conveyance Amount Error During Rewinding)

Figure 7:
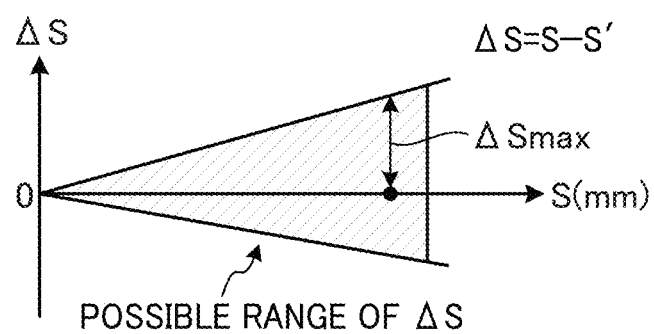
FIG. 7 is a diagram for explaining a conveyance error at the time of rewinding.

FIG. 7 is a diagram for explaining a conveyance amount error at the time of rewinding. In FIG. 7, a conveyance error $\Delta S$ can be defined as "target conveyance amount S minus actual conveyance amount S' ($\Delta S = S - S'$)" in the sub-scanning reverse direction C. A possible range (indicated by hatching in FIG. 7) of the conveyance error $\Delta S$ increases in proportion to the target conveyance amount S. An inclination of the possible range of the conveyance error $\Delta S$ varies depending on the type of the recording medium M. When the conveyance error $\Delta S$ is a plus value, the actual rewinding conveyance amount is insufficient relative to the target rewinding conveyance amount S. Conversely, when the conveyance error $\Delta S$ is a minus value, the actual rewinding conveyance amount is greater than the target rewinding conveyance amount S.

In the present embodiment, a maximum value of possible conveyance error $\Delta S$ on plus-side (hereinafter "maximum conveyance error $\Delta S_{max}$") is a conveyance amount margin in rewinding. Since the conveyance amount margin changes in accordance with the type of the recording medium M, the CPU 41 of the controller 61 calculates in advance as a design value.

(Printing Example of Position Adjustment Marker Pattern)

Figure 8:
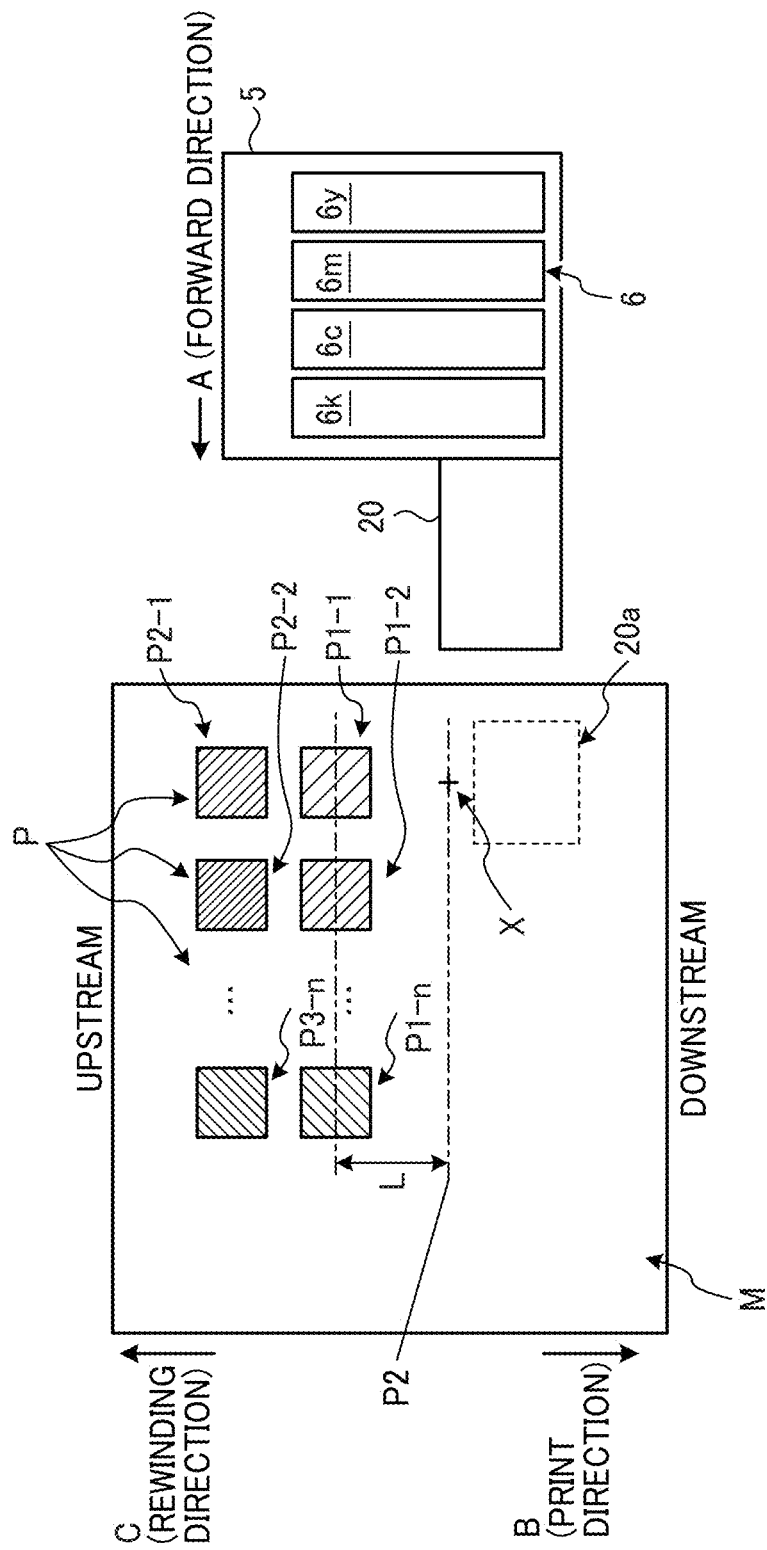
FIG. 8 illustrates a printing example of a position adjustment marker pattern.
Figure 9:
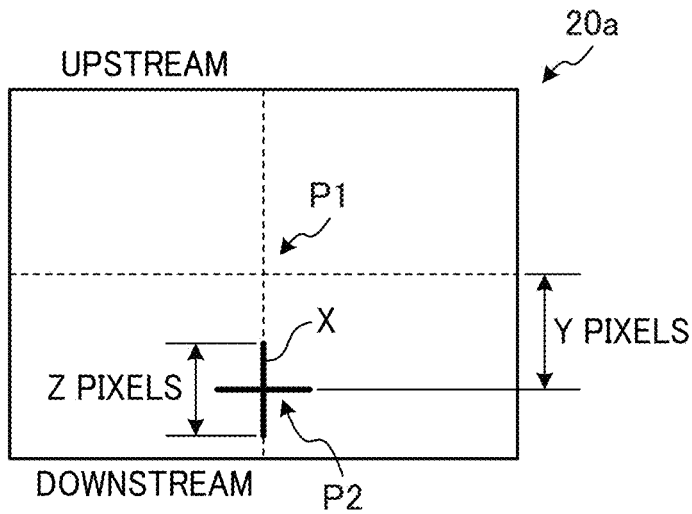
FIG. 9 illustrates an image capturing example of the position adjustment marker pattern.
Figure 10:
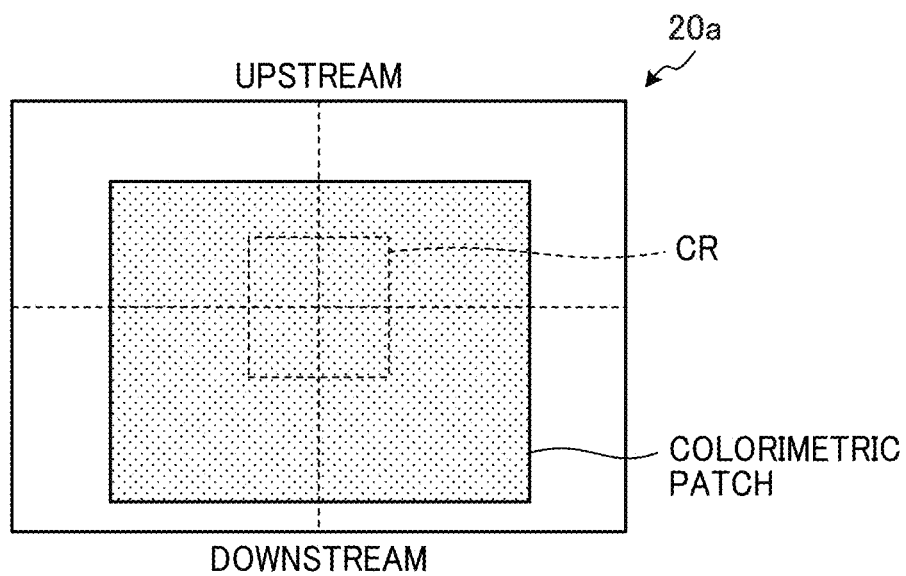
FIG. 10 is a diagram illustrating an example of image capturing at the time of colorimetry.

FIG. 8 illustrates a printing example of the position adjustment marker pattern. FIG. 9 illustrates an example of image capturing of the marker pattern. FIG. 10 illustrates an example of image capturing at the time of colorimetry. As described above with reference to the example illustrated in FIG. 6, the marker pattern X and the colorimetric pattern P are printed on the recording medium M. After printing the entire colorimetric pattern P, the ink is dried. When the drying process is performed by the drying heater 17 of the sheet ejection guide, the recording medium M is conveyed to the sheet ejection guide. In the case of natural drying (leaving the colorimetric pattern at the recording position for a predetermined time), conveyance in the sub-scanning direction B may be omitted after printing the last row of the colorimetric pattern P.

In the present embodiment, the inkjet recording apparatus 100 does not perform the conveyance amount adjustment at the time of rewinding. Instead, after the colorimetric pattern P is printed and dried, the inkjet recording apparatus 100 rewinds the recording medium M by the sum of the length of the calorimetric pattern P, the distance L from the calorimetric pattern P to the marker pattern X, and the above-described conveyance amount margin. Specifically, the inkjet recording apparatus 100 calculates the maximum conveyance error ΔSmax from the target rewinding conveyance amount and rewinds the recording medium M by the amount including the maximum conveyance error ΔSmax, so that the marker pattern X is positioned upstream from a start position (on the downstream side) of an image capturing range 20a.

After the rewinding is completed, the position of the carriage 5 in the main scanning direction is adjusted so that the marker pattern X is located inside the image capturing range 20a of the two-dimensional sensor 20. After adjusting the position of the carriage 5 in the main scanning direction A, the two-dimensional sensor 20 captures an image of the recording medium M and detects the marker pattern X.

If the marker pattern X is not detected, the recording medium M is conveyed in the sub-scanning direction B (print direction) so that the upstream side area enters the image capturing range 20a. Note that an approximate width of the image capturing range 20a is known assuming that such a distance that the thickness of the recording medium M can be ignored is maintained between the two-dimensional sensor 20 and the recording medium M.

After the recording medium M is conveyed in the sub-scanning direction B (print direction), the above-described imaging process is performed again. The image capturing and conveyance of the recording medium M are alternately performed until the marker pattern X is detected.

When the marker pattern X is detected, as illustrated in FIG. 9, the inkjet recording apparatus 100 calculates the number Y of pixels by which a center P1 of the image capturing range 20a is deviated from a center position P2 of the marker pattern X in the sub-scanning direction B in which the recording medium M is conveyed (hereinafter "deviation pixel number Y").

Here, assuming that the marker pattern X has a print size a (mm) and Z pixels, a length $\alpha$ per pixel of the marker pattern X can be calculated as "$\alpha=a/Z$" (in millimeters). As described above, since the distance between the two-dimensional sensor 20 and the recording medium M is roughly known, the length $\alpha$ per pixel is also roughly known, so the calculation of length in detail may be omitted. As illustrated in the image capturing example at the time of colorimetry in FIG. 10, the size of each patch (e.g., the patch P1-1) of the colorimetric pattern P is larger than an image capturing range CR for colorimetry processing. Accordingly, even if there are some conveyance amount errors, colorimetry processing is not affected.

From the deviation pixel number Y and the length $\alpha$ per pixel of the marker pattern X, the deviation of the marker pattern X from the center P1 of the image capturing range 20a is expressed as "Y×$\alpha$" (in millimeters).

Here, when the marker pattern X is captured downstream from the center P1 of the image capturing range 20a, the distance from the center P1 of the image capturing range 20a to the first row of the colorimetric patch is calculated by deducting "Y×$\alpha$" from the distance L (illustrated in FIG. 8) from the marker pattern X to the first patch row (L−Y×$\alpha$). Conversely, when the marker pattern X is captured upstream from the center P1 of the image capturing range 20a, the distance from the center P1 of the image capturing range 20a to the first patch row is expressed as "L+Y×$\alpha$". By conveying the recording medium M in the sub-scanning direction B (print direction) by the length thus calculated, the two-dimensional sensor 20 (the imaging device) can capture an image of the colorimetric patch on the first row.

(Flow of Conveyance Control)

Figure 11:
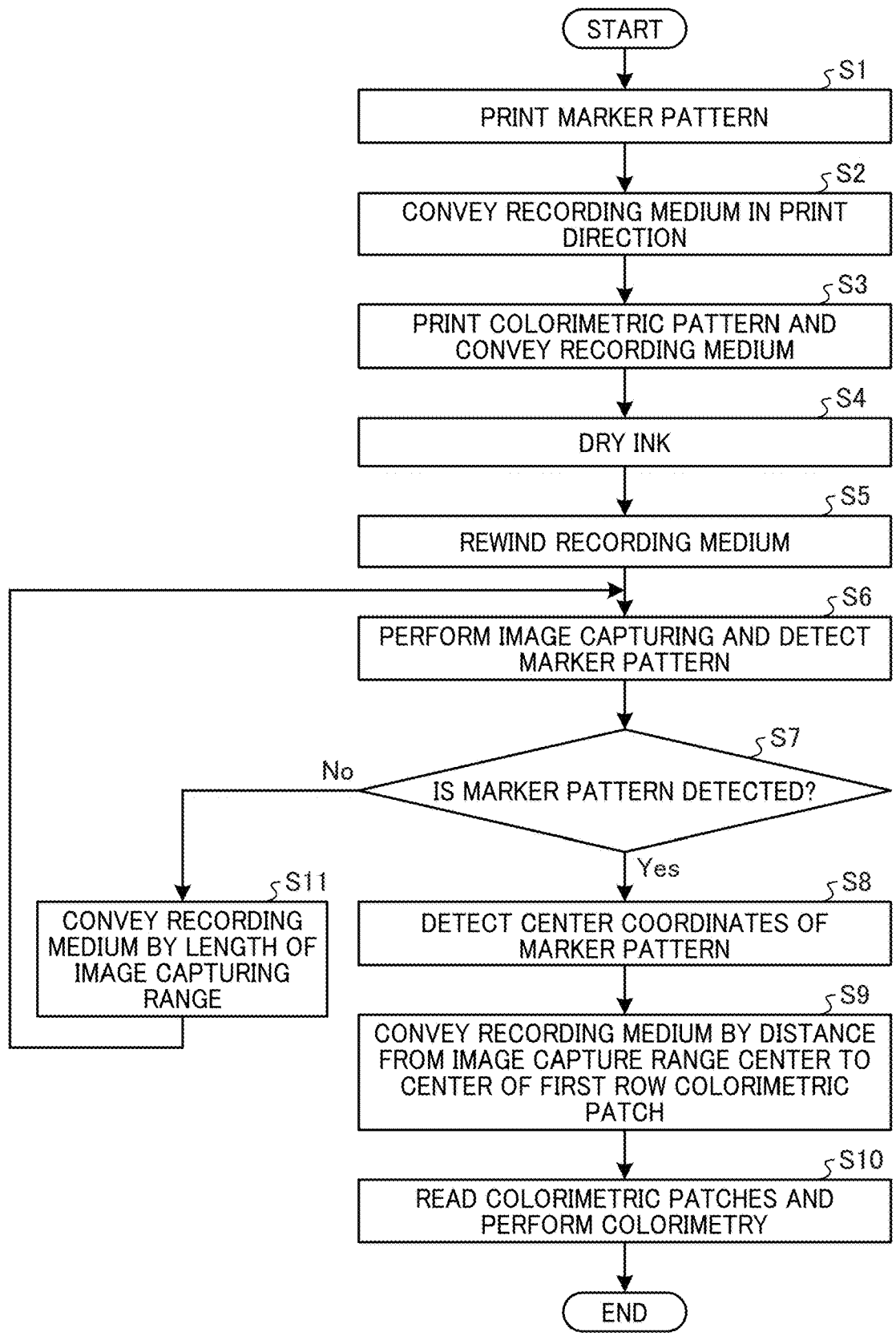
FIG. 11 is a flowchart illustrating a flow of conveyance control in the inkjet recording apparatus according to an embodiment.

FIG. 11 is a flowchart illustrating the flow of conveyance control in the inkjet recording apparatus 100 according to an embodiment. Under the control of the CPU 41 of the controller 61 illustrated in FIG. 3, the inkjet recording apparatus 100 executes each process in this flowchart based on a conveyance control program stored in a memory 68.

In S1, the inkjet recording apparatus 100 prints the marker pattern X (one marker pattern) on the recording medium M.

In S2, the inkjet recording apparatus 100 conveys the recording medium M in the print direction.

In S3, the inkjet recording apparatus 100 prints the colorimetric patches of the colorimetric pattern P. The inkjet recording apparatus 100 repeats conveyance of the recording medium M and printing of the colorimetric patches until the printing of the colorimetric pattern P is completed.

In S4, the drying heater 17 performs the drying process of the ink (or the ink is dried by natural drying).

In S5, the inkjet recording apparatus 100 conveys the recording medium M in the rewinding direction by the amount including the margin of the conveyance error until the image capturing range 20a of the two-dimensional sensor 20 is located downstream from the colorimetric pattern P in the sub-scanning direction B.

In S6, the two-dimensional sensor 20 captures an image of the recording medium M and performs detection process of the marker pattern X.

In S7, the CPU 41 determines whether or not the marker pattern X has been detected.

In S8, in response to the detection result that the marker pattern X is detected (step S7, Yes), the CPU 41 detects the center point coordinates of the marker pattern X.

In S9, the CPU 41 calculates the distance from the center coordinates of the image capturing range 20a of the two-dimensional sensor 20 to the center coordinates of the colorimetric patch on the first row, and the inkjet recording apparatus 100 conveys the recording medium M in the print direction by the calculated distance.

In S10, the inkjet recording apparatus 100 sequentially reads the colorimetric patches of the colorimetric pattern P and performs colorimetry of all patches. Then, the process on the flowchart ends.

In S11, in response to a detection result that the marker pattern X is not detected (in S7, No), the inkjet recording apparatus 100 conveys the recording medium M in the sub-scanning direction B (print direction) by the length of the image capturing range 20a. Then, the process returns to S6.

When the inkjet recording apparatus 100 prints the marker pattern at the distance L1 downstream from the colorimetric pattern P in the sub-scanning direction B, the inkjet recording apparatus 100 can calculate the start position of the colorimetric pattern P from the position of the detected marker pattern and adjust the position of the image capturing range 20a (colorimetry range) of the two-dimensional sensor 20 with the start position of the colorimetric pattern P.

Embodiment 1

Next, an inkjet recording apparatus 100 according to Embodiment 1 will be described. Note that, in order to avoid redundant descriptions, only differences from the above-mentioned example are described.

Figure 12:
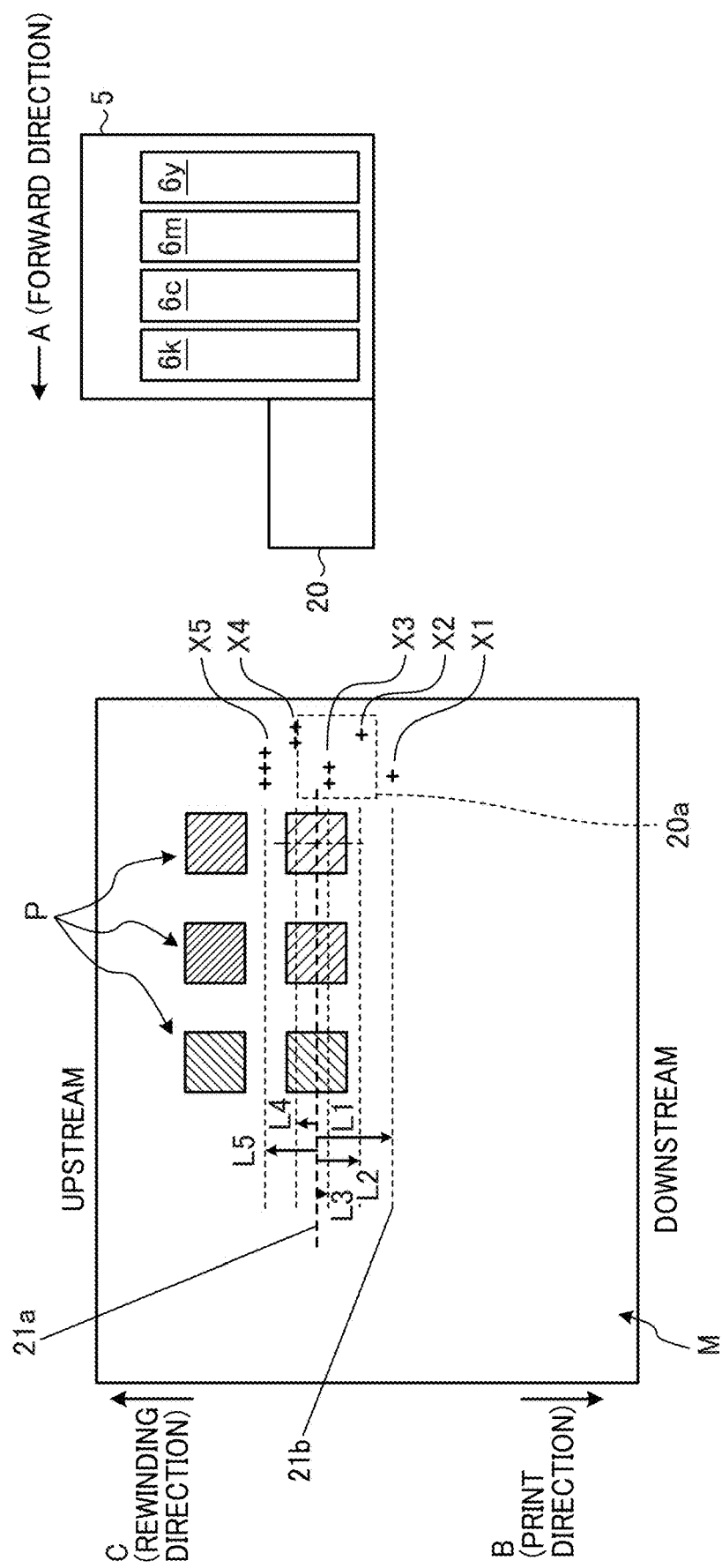
FIG. 12 is a diagram illustrating a print example of position adjustment marker patterns in an inkjet recording apparatus according to Embodiment 1.
Figure 13:
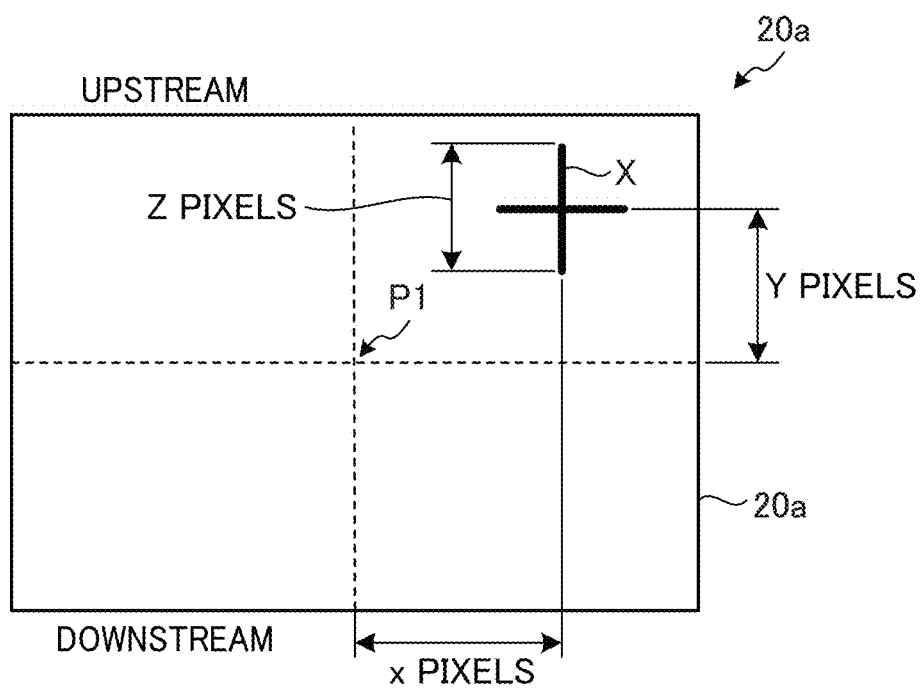
FIG. 13 is a diagram illustrating another print example of position adjustment marker patterns in the inkjet recording apparatus according to Embodiment 1.

FIGS. 12 and 13 are diagrams illustrating print examples of the position adjustment marker patterns printed by the inkjet recording apparatus 100 according to Embodiment 1. In Embodiment 1, a plurality of marker patterns, such as marker patterns X1 to X5 (collectively "marker patterns X"), and the colorimetric pattern P are printed on the recording medium M.

The marker patterns X1 to X5 are printed out of the range of the colorimetric pattern P in the main scanning direction A. Further, the marker pattern X3 at the center of the marker patterns X1 to X5 is disposed downstream from a center 21a of the first row in the colorimetric pattern P. The marker patterns X3 to X5 (downstream marker patterns) are positioned downstream from the center 21a of the first row of the colorimetric pattern P, and the marker pattern X3 is the closest to the center 21a of the first row among the downstream-side marker patterns X3 to X5. The marker pattern X3 is hereinafter also referred to as "closest downstream marker pattern X3". The marker patterns X1 to X5 are equally spaced in the sub-scanning direction B. In the sub-scanning direction B, the interval between the marker patterns X1 to X5 is equal to or smaller than the length of the image capturing range 20a of the two-dimensional sensor 20 (the imaging device). Thereby, one or more of the marker patterns X1 to X5 can be printed in the image capturing range 20a of the two-dimensional sensor 20 (the imaging device). After the colorimetric pattern P and the marker patterns X1 to X5 are printed, the drying heater 17 performs the drying process of the ink.

Subsequently, similarly to the description above, the recording medium M is conveyed in reverse (rewound). Specifically, the inkjet recording apparatus 100 conveys the recording medium M in the sub-scanning reverse direction C (rewinding direction) by the sum of the target conveyance amount S and the maximum conveyance error ΔSmax until the image capturing range 20a of the two-dimensional sensor 20 (the imaging device) targets the marker pattern X3, which is the closest downstream marker pattern X3 relative to the first row of the colorimetric pattern P in the sub-scanning direction B. From the following reason, the closest downstream marker pattern X3 relative to the first row of the colorimetric pattern P is targeted in rewinding. In the case where the marker pattern X3 is detected, while the recording medium M is conveyed in the sub-scanning direction B (print direction), the carriage 5 can be moved to the center 21a of the first row in the colorimetric pattern P with a high accuracy and in the shortest number of times of conveyance.

Additionally, the marker patterns X1 and X2 are disposed downstream from the marker pattern X3, while the marker patterns X4 and X5 are disposed upstream from the marker pattern X3. Such arrangement can secure a margin for the rewinding conveyance control, even if the accuracy in rewinding is not high, with the marker pattern X3 as the center, any one of the marker patterns X1 to X5 can be detected.

After completion of the rewinding, the position of the carriage 5 in the main scanning direction is adjusted so that, in the main scanning direction A, a center of the center maker pattern (the marker pattern X3 in this example) of the marker pattern group enters the image capturing range 20a of the two-dimensional sensor 20 (the imaging device). As the marker patterns X3 to X5, for example, a plurality of cross (+) symbols are arranged. When an odd number of cross symbols are arranged, the "center of the center maker pattern" is an intersection of the center cross symbol. When an even number of cross symbols are arranged, the "center of the center maker pattern" is a center between the cross symbols at both ends is the center.

As described above, after the position of the carriage 5 in the main scanning direction is adjusted, the recording medium M is captured by the two-dimensional sensor 20 (the imaging device), and any one of the marker patterns X1 to X5 is detected. The marker patterns X1 to X5 illustrated in FIG. 12 are different from each other in number of "+" (cross) symbols and position in the main scanning direction A, so that each of the marker patterns X1 to X5 is identified by the difference. In the example illustrated in FIG. 13, since the marker pattern X is detected on the right side of the center P1 of the image capturing range 20a, the detected marker pattern X can be identified as the marker pattern X2 or X4. Similarly, when the marker pattern X is detected on the left side of the center P1 of the image capturing range 20a, the detected marker pattern X can be identified as the marker pattern X1, X3, or X5. The identification of the marker patterns X1 to X5 is made based on the position in the main scanning direction A (the lateral position in the image capturing range 20a) and the number of cross symbols.

When any of the marker patterns X1 to X3 is detected, the CPU 41 calculates the distance from the center coordinates of the image capturing range 20a of the two-dimensional sensor 20 (the imaging device) to the center coordinates of the first row in the colorimetric pattern P, and the inkjet recording apparatus 100 conveys the recording medium M in the sub-scanning direction B (print direction) by the calculated distance. That is, the distance to the center coordinates of the first row in the colorimetric pattern P is calculated in accordance with the number of marker patterns X. Thereafter, the colorimetric patches in the colorimetric pattern P are sequentially read, and colorimetry is performed for all patches.

When the marker pattern X4 or X5 is detected, the CPU 41 calculates the distance from the center coordinate of the corresponding marker pattern to the center coordinate of the closest downstream marker pattern X3 relative to the colorimetric patch on the first row. Then, the medium M is conveyed in the sub-scanning reverse direction C (rewinding direction). That is, the distance to the center coordinate of the marker pattern X3 is calculated in accordance with the ordinal number of the marker patterns X. The process thereafter is similar to the process for the case where any of the marker patterns X1 to X3 is detected.

The recording medium M is conveyed in reverse firstly to the closest downstream marker pattern X3 relative to the first row of colorimetric pattern P because the conveyance accuracy is higher in feeding the recording medium M in the sub-scanning direction B than in rewinding the recording medium M in the sub-scanning reverse direction C. Therefore, the recording medium M is rewound to position the two-dimensional sensor 20 at the marker pattern X located downstream from the colorimetric pattern P, after which the recording medium M is fed in the sub-scanning direction B (print direction) to optimize the relative positions between the center 21a of the first row of the colorimetric pattern P and the image capturing range 20a of the two-dimensional sensor 20 (the imaging device).

In the case of the marker pattern X1, the distance from the center coordinates of the marker pattern X1 to the colorimetric patch on the first row is the distance L1. In the example illustrated in FIG. 13, the marker pattern X1 is disposed above (upstream in the sub-scanning direction B from) the center P1 of the image capturing range 20a. Accordingly, the distance from the center P1 of the image capturing range 20a to the first row of the colorimetric patch is expressed as "L1+y×α". Then, the recording medium M is conveyed in the sub-scanning direction B (print direction) by the length calculated by the above-described calculation, thereby positioning the colorimetric patch on the first row in the image capturing range 20a of the two-dimensional sensor 20 (the imaging device).

Figure 14:
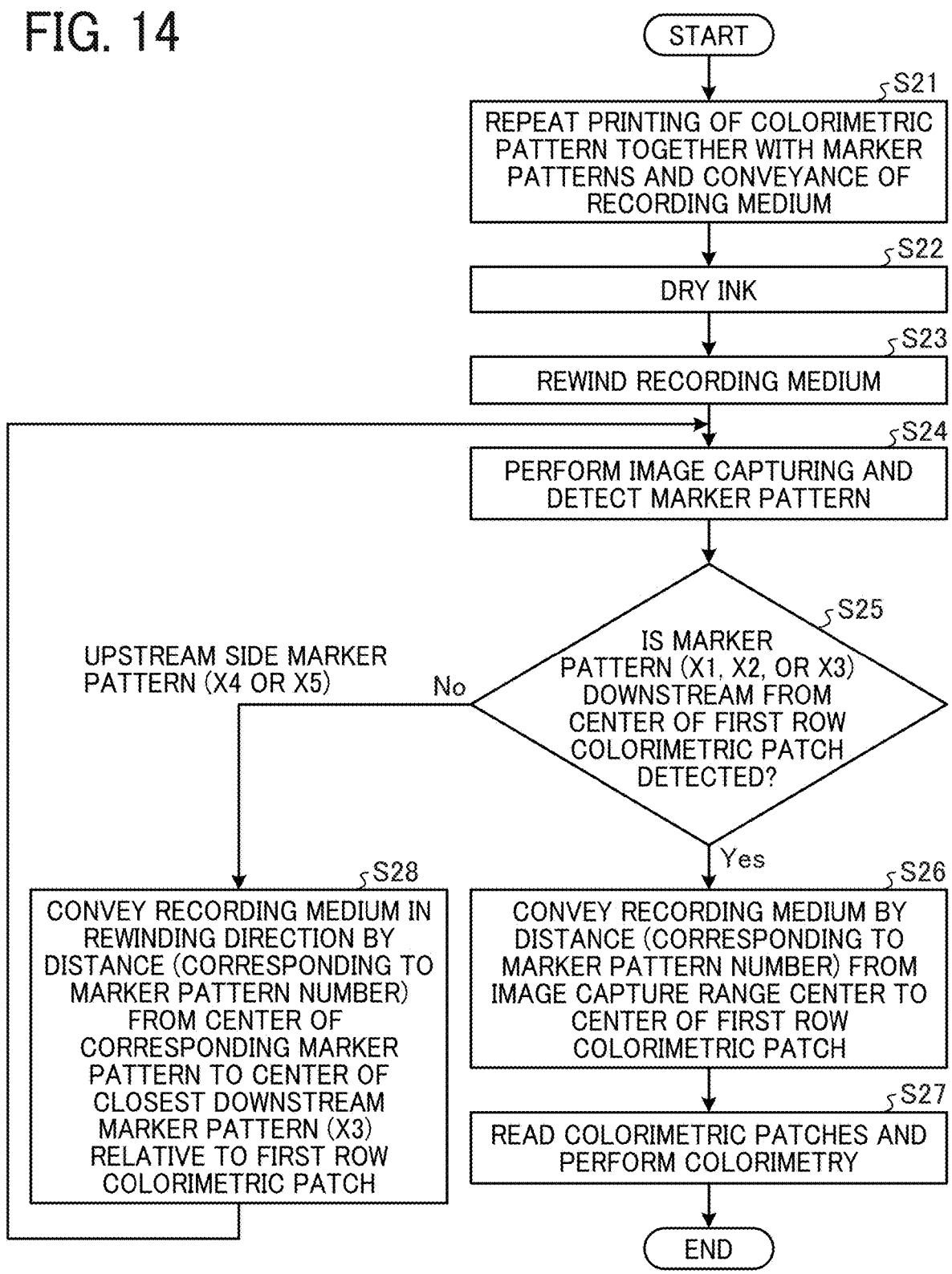
FIG. 14 is a flowchart illustrating a flow of conveyance control according to Embodiment 1.

FIG. 14 is a flowchart illustrating a flow of conveyance control according to Embodiment 1. Under the control of the CPU 41 of the controller 61 illustrated in FIG. 3, the inkjet recording apparatus 100 executes each process in FIG. 14 based on a conveyance control program stored in a memory 68.

In S21, simultaneously with printing of the colorimetric pattern P, the inkjet recording apparatus 100 prints the marker patterns X1 to X5 outside the colorimetric pattern range in the main scanning direction A. The inkjet recording apparatus 100 repeats conveyance of the recording medium M and printing of the colorimetric patches until the printing of the colorimetric pattern P is completed.

In S22, the drying heater 17 performs the drying process of the ink.

In S23, the inkjet recording apparatus 100 conveys the recording medium M in the rewinding direction by the amount including the conveyance error margin until the image capturing range 20a of the two-dimensional sensor 20 (the imaging device) is located downstream from the colorimetric pattern P in the sub-scanning direction B.

In S24, the two-dimensional sensor 20 captures the marker pattern X.

In S25, the CPU 41 determines whether the marker pattern X (X1, X2, or X3) located downstream from the center 21a of the first row of the colorimetric patch in the sub-scanning direction B is detected.

In S26, in response to a determination that the marker pattern X located downstream from the center 21a in the sub-scanning direction B of the colorimetric patch on the first row is detected (S25, Yes), the CPU 41 calculates the distance from the center coordinates of the image capturing range 20a of the two-dimensional sensor 20 to the center coordinates of the colorimetric patch on the first row, and the inkjet recording apparatus 100 conveys the recording medium M in the print direction by the calculated distance (the distance is calculated in accordance with the ordinal number of the marker pattern X).

In S27, the inkjet recording apparatus 100 sequentially reads the colorimetric patches of the colorimetric pattern P and performs colorimetry of all patches.

In S28, in response to a determination that the marker pattern X located upstream from the center 21a in the sub-scanning direction B of the colorimetric patch on the first row (S25, No) is detected, the CPU 41 calculates the distance from the center coordinate of the corresponding marker pattern to the center coordinate of the closest downstream marker pattern X3 relative to the colorimetric patch on the first row. Then, the medium M is conveyed in the rewinding direction (the distance is calculated in accordance with the ordinal number of the marker pattern X). Then, the process returns to S24.

Disposing the marker pattern on the side of the colorimetric pattern P can minimize the recording medium M used for the position adjustment, by rewinding, with the colorimetric pattern. Further, the number of marker patterns can be increased on the side without worrying about the increase in consumption of the recording medium M used for the position adjustment. Thus, the control margin can be secured, and the accuracy of conveyance of the recording medium M can be improved. Further, since the control margin can be secured, the recording medium M can be rewound at a high speed, and the processing can be speeded up.

Additionally, arranging the marker pattern on the side of the colorimetric pattern P (outside the colorimetric pattern range in the main scanning direction A) is advantageous in that a large number of marker patterns long in the main scanning direction A can be disposed. Accordingly, the margin in reverse conveyance control can be secured. In addition, the amount of media consumed for adjustment can be minimized while securing the margin for control. Specifically, arrangement of the marker pattern downstream from the colorimetric pattern P can be minimum.

In addition, since the marker patterns are printed at regular intervals in the sub-scanning direction B, the controller 61 can determine the ordinal number of the detected marker pattern counted from the position of the image capturing range 20a in the main scanning direction. Then, since the distance from the coordinates of the center point of the detected marker pattern to the coordinates of the colorimetric pattern P is unique to each of the plurality of marker patterns, calculation between positions of the colorimetric pattern P.

In short, the inkjet recording apparatus 100 according to Embodiment 1 can obviate a higher accuracy in the rewinding conveyance of the recording medium M, and the conveyance mechanism can be simplified. In addition, the amount of recording medium M used for pattern position detection can be minimized. Furthermore, since the position can be detected with a smaller number of times of image capturing for position adjustment, processing can be speeded up.

As described above, arranging the marker patterns X1 to X5 on the side of the colorimetric pattern P (outside the colorimetric pattern range in the main scanning direction A) is advantageous in that a large number of marker patterns long in the main scanning direction A can be disposed. Accordingly, the margin in reverse conveyance control can be secured, and the accuracy of conveyance of the recording medium M can be improved. In addition, the amount of media consumed for adjustment can be minimized while securing the margin for control. Specifically, the marker pattern or marker patterns arranged downstream from the colorimetric pattern P can be minimum.

Embodiment 2

Next, an inkjet recording apparatus 100 according to Embodiment 2 will be described. Note that, in order to avoid redundant descriptions, only differences from the above-mentioned embodiments are described.

Figure 15:
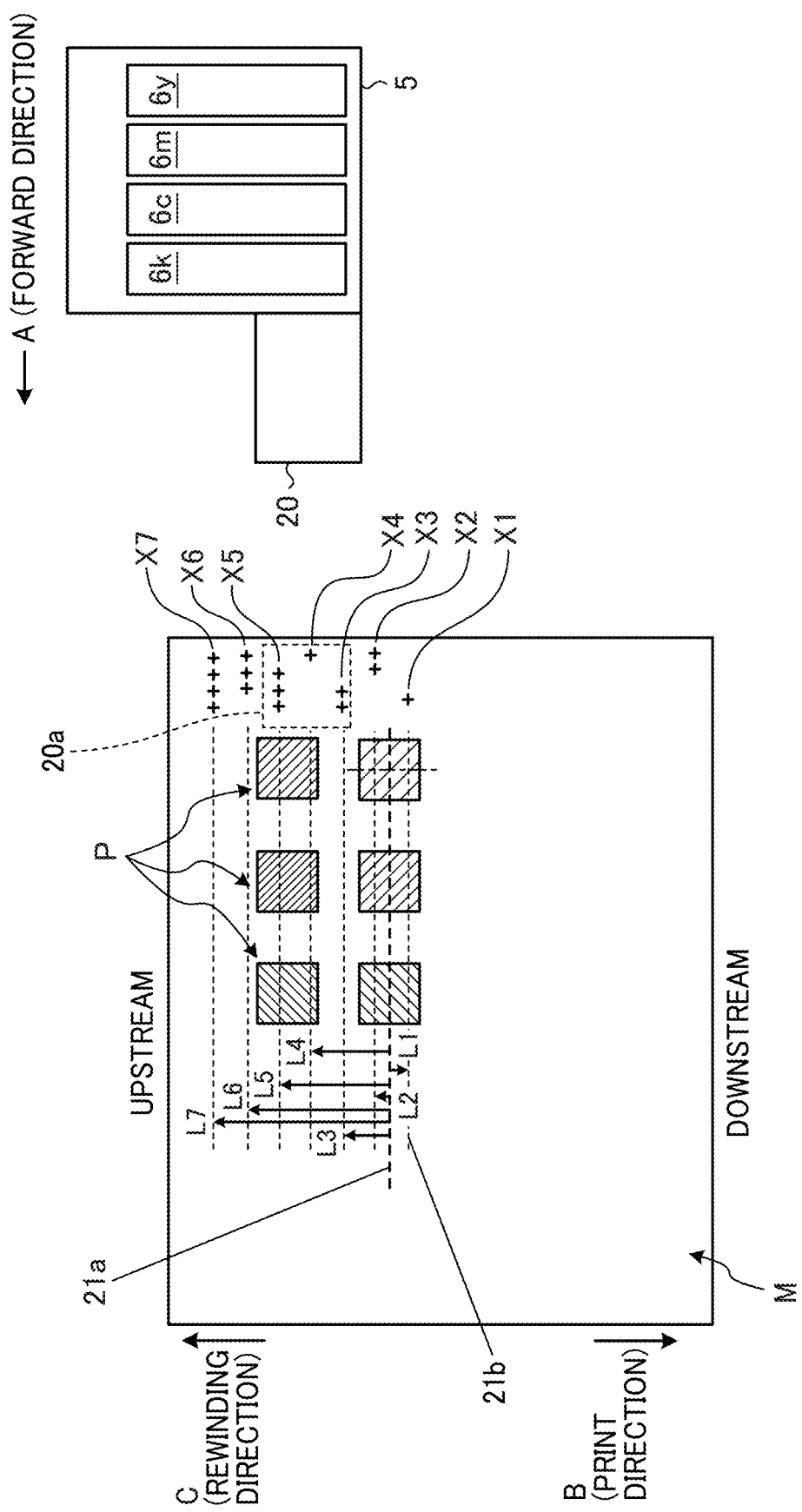
FIG. 15 is a diagram illustrating a print example of position adjustment marker patterns in an inkjet recording apparatus according to Embodiment 2.

FIG. 15 is a plan view illustrating a print example of the position adjustment marker patterns printed by the inkjet recording apparatus 100 according to Embodiment 2. In Embodiment 2, for example, seven marker patterns of marker patterns X1 to X7 (also collectively "marker patterns X") and the colorimetric pattern P are printed on the recording medium M.

The marker patterns X1 to X7 are printed outside the colorimetric pattern range in the main scanning direction A. Further, among the marker patterns X1 to X7, only the marker pattern X1 (a downstream marker patterns) is disposed downstream from the center 21a of the first row of the colorimetric pattern P. The marker patterns X1 to X7 are equally spaced in the sub-scanning direction B, and the interval is equal to or smaller than the length of the image capturing range 20a of the two-dimensional sensor 20 in the sub-scanning direction B. Thereby, one or more marker patterns X can be printed in the image capturing range 20a of the two-dimensional sensor 20. After the colorimetric pattern P and the marker patterns X1 to X7 are printed, the drying heater 17 performs the drying process of the ink.

Subsequently, similarly to Embodiment 1 described above, the recording medium M is conveyed in reverse (rewound). Specifically, the inkjet recording apparatus 100 conveys the recording medium M in the sub-scanning reverse direction C (rewinding direction) by the sum of the target conveyance amount S and the maximum conveyance error ΔSmax until the image capturing range 20a of the two-dimensional sensor 20 targets the marker pattern X4, which is the center of the marker patterns X1 to X7.

From the following reason, the marker pattern X4 at the center of the marker patterns X1 to X7 is targeted in rewinding. In the case where the marker pattern X4 is detected, the marker patterns X1 to X3 and the marker patterns X5 to X7 are present on both sides of the marker pattern X4 in the sub-scanning direction B. That is, three patterns of control margin for detection can be secured on both of the upper side and the lower side in FIG. 15. In this case, since rough control suffices for the rewinding conveyance, the recording medium M can be conveyed at a higher speed than the rewinding speed for normal pattern position detection control. For this reason, when the rewinding distance is large, the recording medium M can be rewound in a shorter time.

In Embodiment 3, two rewinding speeds are set in the inkjet recording apparatus 100. The set speeds are: a rewinding speed V1 (first speed) for rewinding the recording medium M targeting the marker pattern X4; and a rewinding speed V2 (second speed) for rewinding the recording medium M from any one of the marker patterns X2 to X7 to the marker pattern X1. The rewinding speed V1 is faster than the rewinding speed V2 (V1>V2), which can shorten the rewinding time.

After completion of the rewinding, the position of the carriage 5 in the main scanning direction A is adjusted so that a center of the center maker pattern (the marker pattern X4 in this example) of the marker pattern group enters the image capturing range 20a of the two-dimensional sensor 20. As the marker patterns X2, X3, X5, X6, and X7, cross symbols are arranged. When an odd number of cross symbols are arranged, the intersection point of the center cross symbol is the center of that marker pattern. When an even number of cross symbols are arranged, the midpoint between the cross symbols at both ends is the center of that marker pattern.

After adjusting the position of the carriage 5 in the main scanning direction A, the two-dimensional sensor 20 captures an image of the recording medium M and detects one of the marker patterns X1 to X7. The marker patterns X1 to X7 illustrated in FIG. 15 are different from each other in shape (e.g., the number of cross symbols) and position in the main scanning direction A, so that each of the marker patterns X1 to X7 is identified by the difference as described in Embodiment 1.

When any one of the marker patterns X2 to X7 is detected, the CPU 41 calculates the distance from the center coordinate of the detected marker pattern to the center coordinate of the marker pattern X1 located downstream from the center 21a of the first row of the colorimetric pattern P (the distance is calculated in accordance with the ordinal number of the marker pattern X). Then, the medium M is conveyed in the sub-scanning reverse direction C, which is the rewinding direction by the calculated distance.

The recording medium M is conveyed in reverse firstly to the marker pattern X1 (downstream from the center 21a of the first row of the colorimetric pattern P) for the following reason. The conveyance accuracy in feeding the recording medium in the sub-scanning direction B is higher than that in returning the recording medium in the sub-scanning reverse direction C. Therefore, the recording medium is conveyed in reverse until the marker pattern downstream from the colorimetric pattern P enters the image capturing range 20a, after which the recording medium is fed in the sub-scanning direction B (print direction). Such an operation can optimize the relative positions between the center 21a of the first row of the colorimetric pattern P and the image capturing range 20a of the two-dimensional sensor 20.

In the case where the marker pattern X1 is detected, the distance from the center coordinates of the marker pattern X1 to the colorimetric patch on the first row is the distance L1. As described above in Embodiment 1, the distance from the center P1 (see FIG. 9) of the image capturing range 20a to the first row of the colorimetric patch P is calculated. Then, the recording medium M is conveyed in the sub-scanning direction B (print direction) by the length thus calculated, thereby positioning the colorimetric patch on the first row in the image capturing range 20a of the two-dimensional sensor 20. Thereafter, the colorimetric patches are sequentially read, and colorimetry is performed for all patches.

Figure 16:
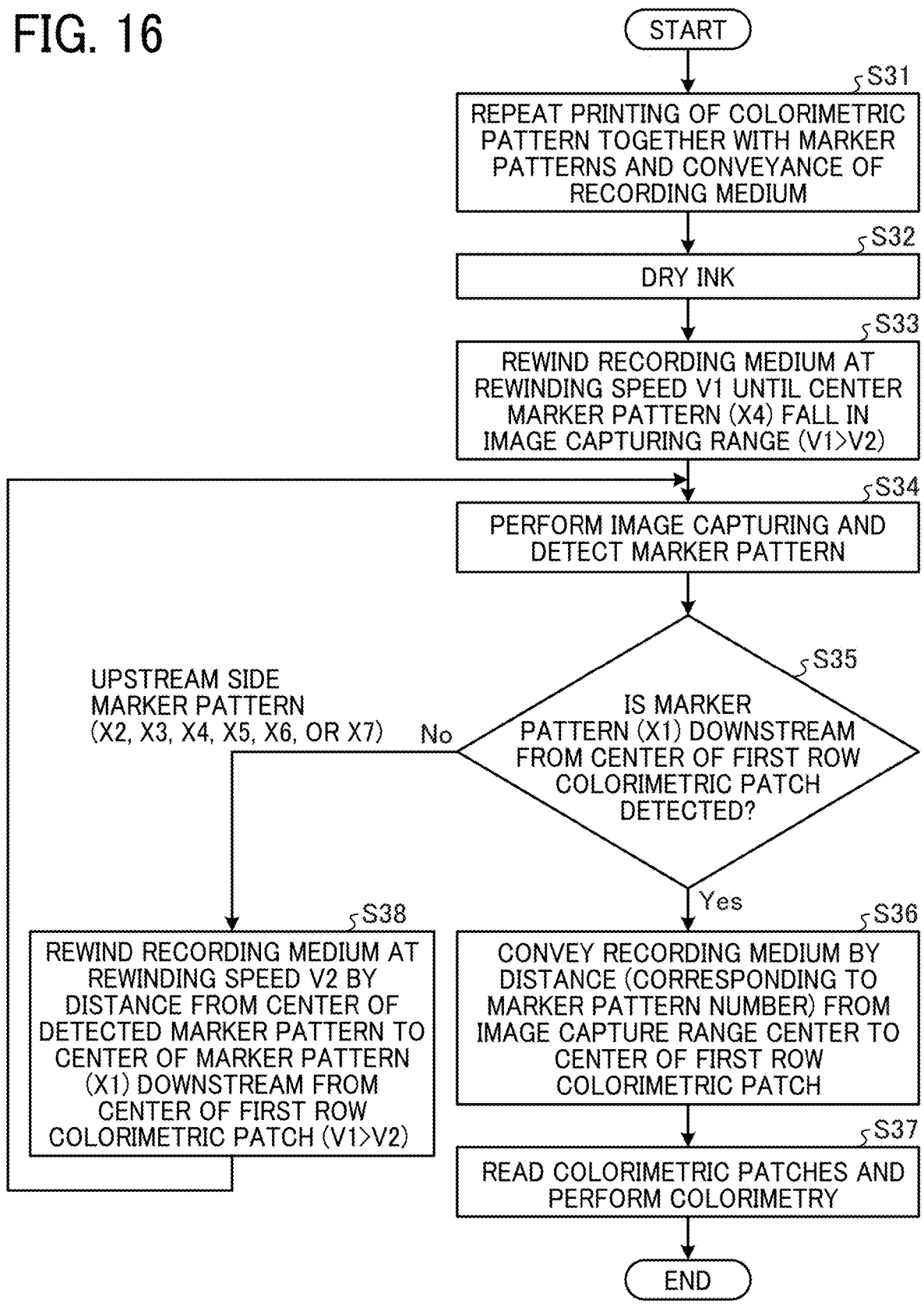
FIG. 16 is a flowchart illustrating a flow of conveyance control according to Embodiment 2.

FIG. 16 is a flowchart illustrating a flow of conveyance control according to Embodiment 2. Under the control of the CPU 41 of the controller 61 illustrated in FIG. 3, the inkjet recording apparatus 100 executes each process in FIG. 16 based on a conveyance control program stored in a memory 68.

In S31, simultaneously with printing of the colorimetric pattern P, the inkjet recording apparatus 100 prints the marker patterns X1 to X7 outside the colorimetric pattern range in the main scanning direction A. The inkjet recording apparatus 100 repeats conveyance of the recording medium M and printing of the colorimetric patches until the printing of the colorimetric pattern P is completed.

In S32, the drying heater 17 performs the drying process of ink.

In S33, the inkjet recording apparatus 100 conveys the recording medium M at the rewinding speed V1 (V1>V2), by the amount including the conveyance error margin in the rewinding direction, so that the image capturing range 20a of the two-dimensional sensor 20 (the imaging device) is set at the marker pattern X4 at the center of the marker patterns X1 to X7.

In S34, the two-dimensional sensor 20 captures and detects the marker pattern X.

In S35, the CPU 41 determines whether the detected marker pattern X is the marker pattern X1 located downstream from the center 21a of the first row of the colorimetric patch in the sub-scanning direction B.

In S36, in response to a determination that the detected marker pattern X is the marker pattern X1 located downstream from the center 21a of the colorimetric patch on the first row in the sub-scanning direction B (S35, Yes) is detected, the CPU 41 calculates the distance from the center coordinates of the image capturing range 20a of the two-dimensional sensor 20 to the center coordinates of the colorimetric patch on the first row, and the inkjet recording apparatus 100 conveys the recording medium M in the print direction by the calculated distance (the distance is calculated corresponding to the ordinal number of the marker pattern X).

In S37, the inkjet recording apparatus 100 sequentially reads the colorimetric patches of the colorimetric pattern P and performs colorimetry of all patches. Then, the process on the flowchart in FIG. 16 ends.

In S38, in response to a determination that the detected marker pattern X is any of the marker patterns (X2 to X7) located upstream from the center 21a of the colorimetric patch on the first row in the sub-scanning direction B (S35, No), the CPU 41 calculates the distance from the center coordinate of the detected marker pattern to the center coordinate of the marker pattern X1 downstream from the center coordinates of the first row of the colorimetric pattern P. Then, the recording medium is returned, by the calculated distance (to the marker pattern X1), in the rewinding direction at the rewinding speed V2 lower than the rewinding speed V1. Thereafter, the process returns to S34.

As described above, arranging the marker patterns X1 to X7 on the side of the colorimetric pattern P (outside the colorimetric pattern range in the main scanning direction A) is advantageous in that a large number of marker patterns long in the main scanning direction A can be disposed. Accordingly, the margin in reverse conveyance control can be secured, and the accuracy of conveyance of the recording medium M can be improved. In addition, the amount of media consumed for adjustment can be minimized while securing the margin for control. Specifically, arrangement of the marker pattern downstream from the colorimetric pattern P can be minimum.

Further, in Embodiment 2, a greater amount of margin for adjustment can be secured compared with Embodiment 1 described above. This configuration can obviate a high accuracy in rewinding conveyance control (rough control suffices), and the recording medium M can be conveyed at a higher speed than the rewinding speed for normal pattern position detection control. For this reason, when the rewinding distance is large, the recording medium M can be rewound in a shorter time.

Although the exemplary embodiments of the present disclosure have been described above, such descriptions are not intended that the disclosure be limited to the illustrated embodiments. Numerous additional modifications and variations are possible in light of the above teachings. For example, although each of the above-described embodiments is an example in which the aspects of the present disclosure are applied to an inkjet recording apparatus, the aspects of the present disclosure can also be applied to an electrophotographic apparatus. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
    a printing device configured to print, on a recording medium, a colorimetric pattern including a plurality of colorimetric patches;
    an imaging device configured to capture and read an image on the recording medium;
    a conveyor configured to convey the recording medium in a conveyance direction; and
    circuitry configured to:
        cause the printing device to form a plurality of marker patterns on a side of the colorimetric pattern on the recording medium and at predetermined intervals in the conveyance direction, the plurality of marker patterns including a downstream marker pattern positioned downstream from a first row of the plurality of colorimetric patches in the conveyance direction;
        cause the conveyor to convey the recording medium to position the colorimetric pattern on the recording medium at a reading position by the imaging device based on a distance between a center coordinate of the plurality of marker patterns and a center coordinate of the colorimetric pattern in the conveyance direction; and
        cause the imaging device to read the colorimetric pattern on the recording medium.

2. The image forming apparatus according to claim 1, wherein the circuitry is configured to:
    cause the conveyor to convey the recording medium to position one of the plurality of marker patterns at the reading position by the imaging device;
    cause the imaging device to capture the recording medium to detect the one of the plurality of marker patterns; and
    cause the conveyor to convey the recording medium to position the downstream marker pattern at the reading position based on a detection result.

3. The image forming apparatus according to claim 1, wherein the plurality of marker patterns is distinguishable from each other by a difference in shape and a position in a main scanning direction in which the printing device moves.

4. The image forming apparatus according to claim 1, wherein the circuitry is configured to:
    cause the conveyor to convey the recording medium to position the downstream marker pattern at the reading position by the imaging device; and
    cause the conveyor to convey the recording medium in the conveyance direction, to align a center of the colorimetric pattern with the reading position by the imaging device in the conveyance direction.

5. The image forming apparatus according to claim 4, wherein the circuitry is configured to:
    cause the conveyor to convey the recording medium to position the plurality of marker patterns at the reading position by the imaging device in a first conveyance control;
    calculate a distance from one of the plurality of marker patterns detected on a captured image by the imaging device to the downstream marker pattern; and
    based on the calculated distance, cause the conveyor to convey the recording medium to adjust the position of the colorimetric pattern at the reading position by the imaging device in a second conveyance control.

6. The image forming apparatus according to claim 5, wherein the circuitry is configured to cause the conveyor to convey the recording medium at a first speed in the first conveyance control, the first speed faster than a second speed at which the conveyor conveys the recording medium in the second conveyance control.

7. A method for conveying a recording medium by an image forming apparatus configured to perform colorimetry, the method comprising:

conveying the recording medium in a conveyance direction;

printing, on the recording medium, a colorimetric pattern including a plurality of colorimetric patches;

printing a plurality of marker patterns on a side of the colorimetric pattern on the recording medium and at predetermined intervals in the conveyance direction, the plurality of marker patterns including a downstream marker pattern positioned downstream from a first row of the plurality of colorimetric patches in the conveyance direction;

conveying the recording medium to position the colorimetric pattern on the recording medium at a reading position by an imaging device based on a distance between a center coordinate of the plurality of marker patterns and a center coordinate of the colorimetric pattern in the conveyance direction; and reading the colorimetric pattern on the recording medium.

8. A non-transitory recording medium storing a plurality of program codes which, when executed by one or more processors, causes the processors to perform a method, the method comprising:

conveying a recording medium in a conveyance direction;

printing, on the recording medium, a colorimetric pattern including a plurality of colorimetric patches;

printing a plurality of marker patterns on a side of the colorimetric pattern on the recording medium and at predetermined intervals in the conveyance direction, the plurality of marker patterns including a downstream marker pattern positioned downstream from a first row of the plurality of colorimetric patches in the conveyance direction;

conveying the recording medium to position the colorimetric pattern on the recording medium at a reading position by an imaging device based on a distance between a center coordinate of the plurality of marker patterns and a center coordinate of the colorimetric pattern in the conveyance direction; and reading the colorimetric pattern on the recording medium.

* * * * *